Jan. 10, 1967 R. C. DURAND 3,296,882
PLURAL DIRECTION SINGLE LEVER OPERATING DEVICE
Filed May 4, 1964 6 Sheets-Sheet 1

Inventor
Roger Claude Durand
By
Karl W. Flocks
Attorney

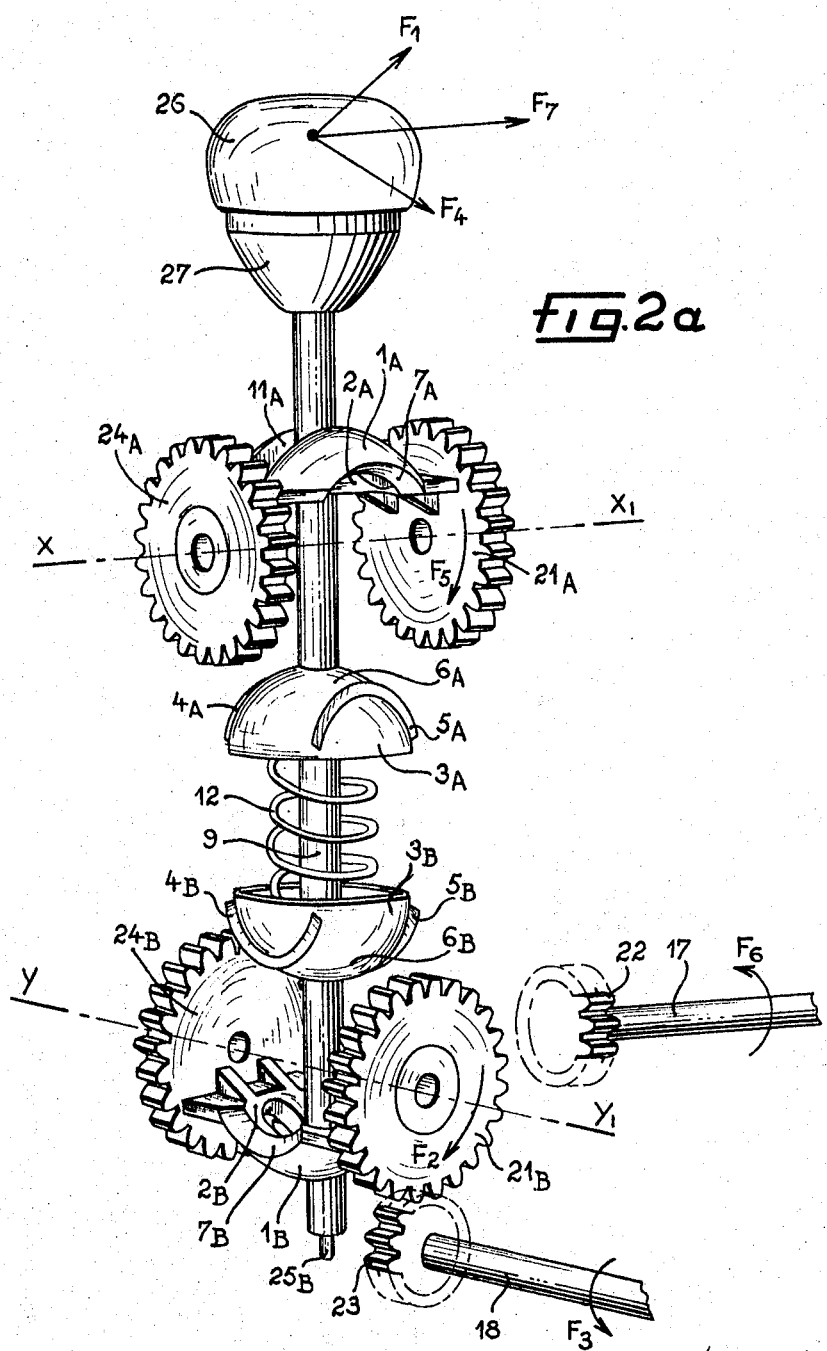

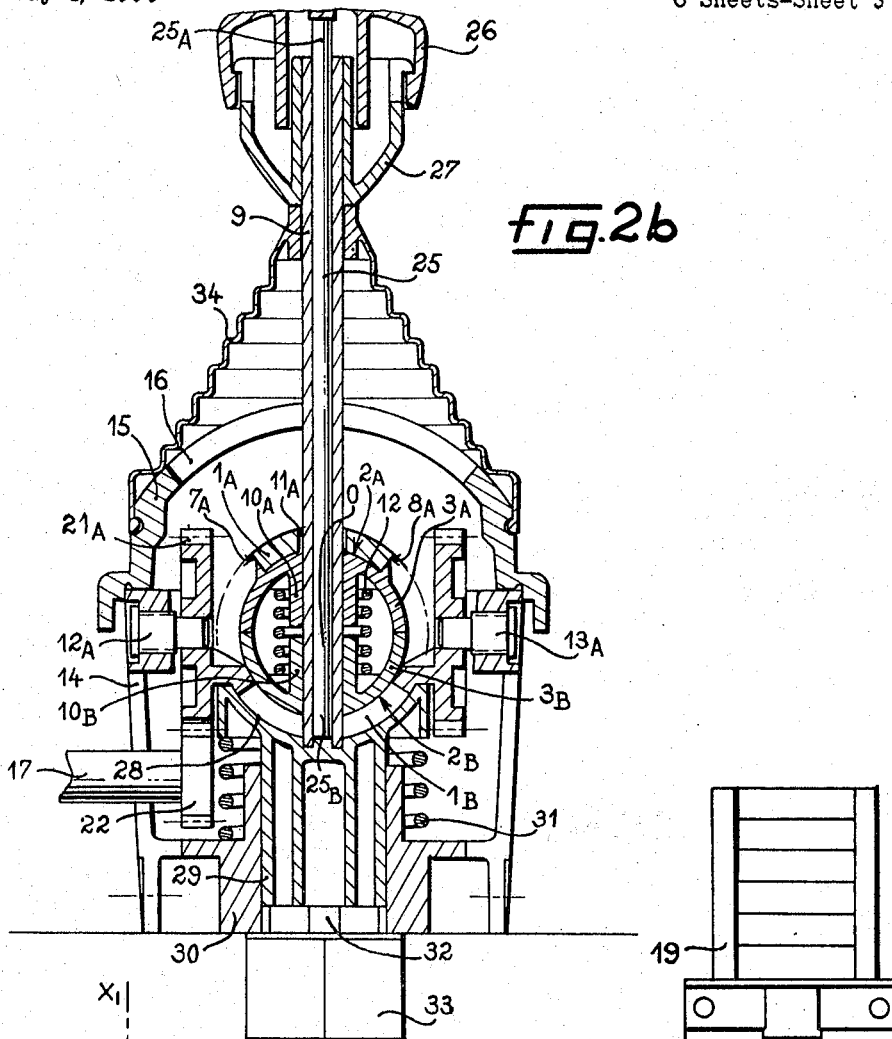
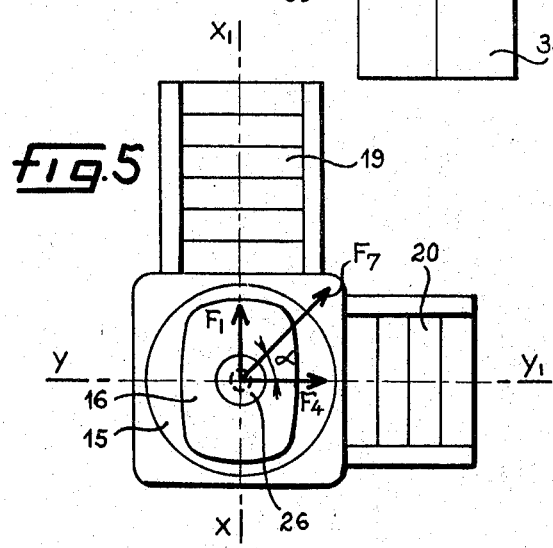
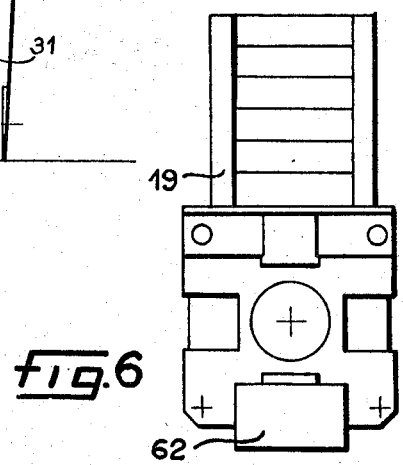

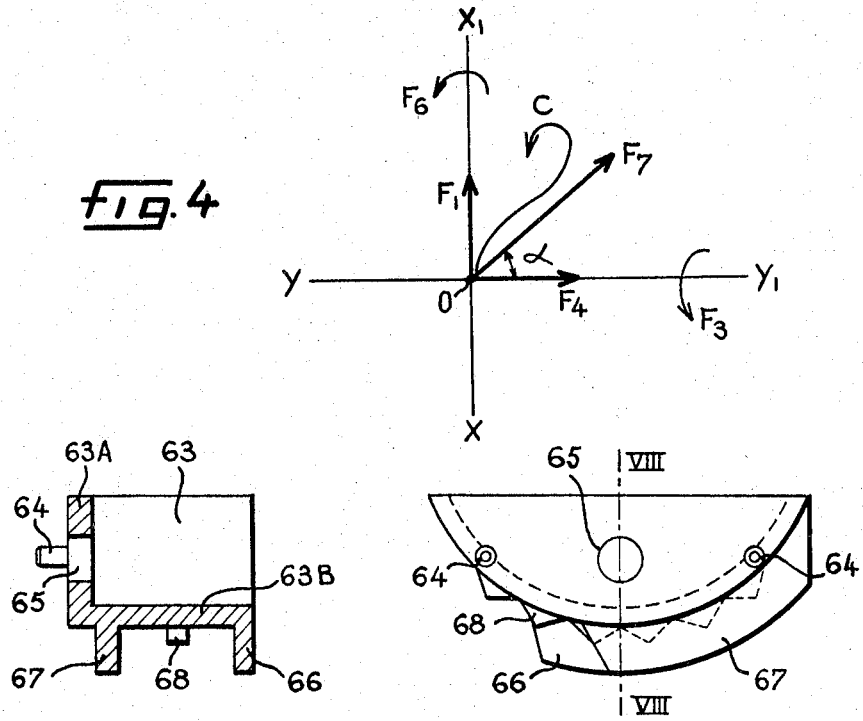
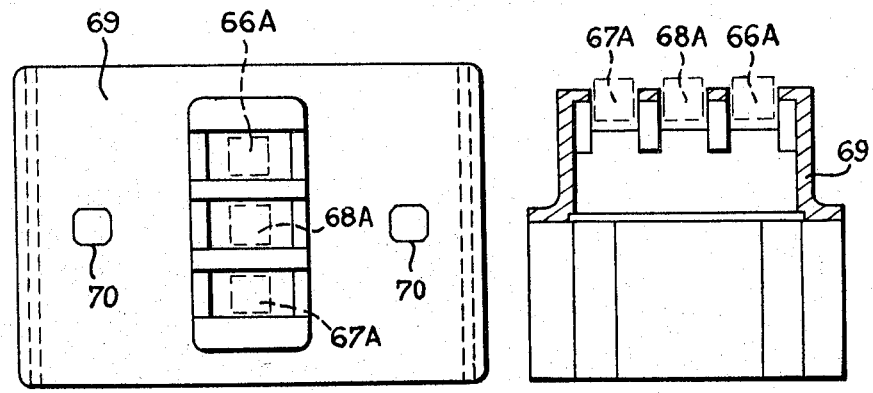

Jan. 10, 1967  R. C. DURAND  3,296,882
PLURAL DIRECTION SINGLE LEVER OPERATING DEVICE
Filed May 4, 1964  6 Sheets-Sheet 6

Inventor
Roger Claude Durand
By
Attorney

United States Patent Office 3,296,882
Patented Jan. 10, 1967

3,296,882
PLURAL DIRECTION SINGLE LEVER
OPERATING DEVICE
Roger Claude Durand, Saint-Germain en Laye, France,
assignor to La Télémécanique Électrique, Nanterre,
France, a joint-stock company of France
Filed May 4, 1964, Ser. No. 364,677
Claims priority, application France, May 6, 1963,
934,297; Jan. 7, 1964, 960,044
14 Claims. (Cl. 74—471)

For the operation of rotary switches with combined movements, it has already been proposed to utilize a single lever which passes through two slides which pivot on two axes located in a plane perpendicular to the neutral position of the lever, these two axes being perpendicular to each other.

With a system of this kind, it is possible to rotate alternately one or the other of the slides, that is to say to cause one or the other of the switches to pivot through a fairly large angle. However, if it is desired to actuate the two switches simultaneously by displacing the lever in a plane which makes a certain angle with the two slides, it is easy to see that, by reason of the adjustment of the lever in the slides and the flat surfaces of the slides, a jamming effect of the system is rapidly reached and the system can only function correctly with a certain play and for angles of the lever which are small with respect to the neutral position.

In addition, on known devices, the switches are of heavy and bulky construction, with levers, springs and various complicated articulations, in order to actuate the contacts.

The present invention obviates these drawbacks.

It has for its object to provide a means for actuating two switches or other similar apparatus by a single lever which can take-up all the desired positions of inclination in two perpendicular planes or in intermediate directions between the planes.

The invention has also for its object to provide in such a device, a very smooth operation having equal reactions in all its positions.

It has also for its object to permit this kind of device to be produced in miniature form with a very simple assembly of parts, these parts having considerable recourse in their manufacture to the moulding techniques of plastic materials and of large-scale manufacture.

The operating device in accordance with the invention is essentially characterized by the fact that it comprises, in combination:

Two slides of cap shape arranged in the neutral position of the system so that their longitudinal planes of symmetry are perpendicular to each other;

A core in two parts enclosed by the two slides, the parts of the core being each provided with lateral guiding ribs arranged along two half circles parallel to the plane of symmetry and defining two zones of width corresponding to that of the slides to which they are complementary and in contact, the said guiding ribs being supported on lateral chamfers of the slides to form slideways;

A single operating lever passing through each of the slides through a slot and the half cores through a circular hole, the longitudinal axis of the said lever passing through the geometric centre of the slides-core assembly; and Means for collecting the movements of rotation impressed on each of the slides about its longitudinal axis of symmetry, by the pivotal movement of the operating lever about the geometric centre of the unit.

In accordance with one form of construction, the surfaces defined by the guiding ribs and also the corresponding inner surfaces of the slides, are spherical zones.

In accordance with a further form of embodiment, these surfaces are cylindrical.

Other characteristic features and advantages of the present invention will be brought out from the description which follows below, reference being made to the accompanying drawings, in which:

FIG. 2a is an exploded perspective view on a larger scale of the various constituent parts of one form of embodiment of the operating device, in accordance with the invention;

FIG. 2b is an axial vertical section of this latter form of embodiment;

FIG. 4 is an explanatory diagram of the operation of a unit of the same kind as that shown in FIGS. 2, 2a and 2b;

FIG. 5 is a diagram showing in plan view the operating device combined with two switches at right angles;

FIG. 6 is a diagram looking from beneath on an operating device according to the invention combined with a contact drum in one direction and a switch unit in another direction;

FIG. 7 is a view in elevation of a cam capable of being fixed on one of the slides of the device for actuating directly a block of switches;

FIG. 8 is a transverse section of the said cam, taken along the line VIII—VIII of FIG. 7;

FIGS. 9 and 10 are views taken respectively from above and in transverse section of a roller guide capable of being adapted on a block of two switches;

Figure 2:
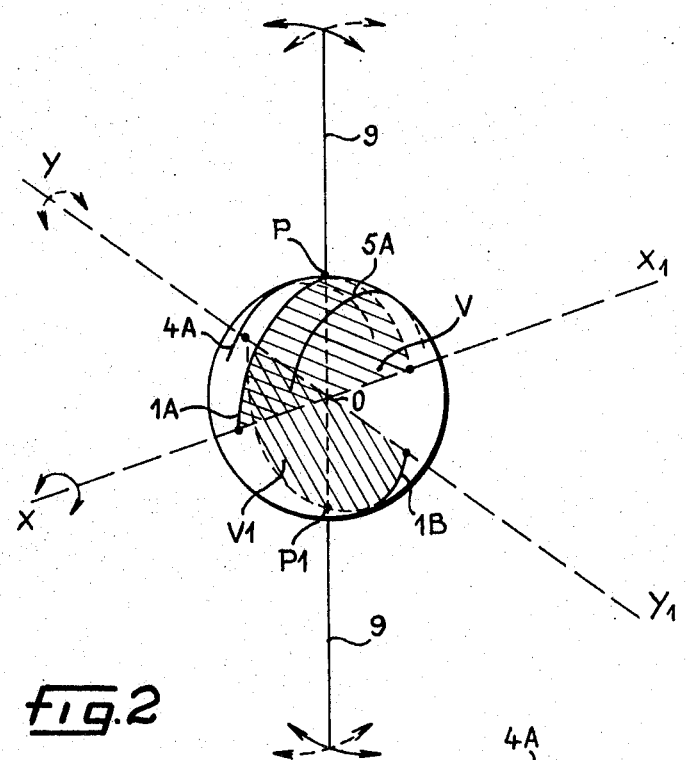
FIGS. 1, 2 and 3 are explanatory diagrams of the invention.

In the form of embodiment shown in FIGS. 2, 2a and 2b, there are provided two slides 1A and 1B of cap shape arranged in two perpendicular longitudinal planes of symmetry V and V1, containing respectively the axis X–X1 of the slide 1A and the axis Y–Y1 for the slide 1B.

These slides are arcs of great circles passing through the poles P and P1 of a sphere having its centre at O.

The two slides enclose a core in two parts 3A and 3B, each of which is provided with lateral guiding ribs 4A–5A and 4B–5B.

Figure 1:
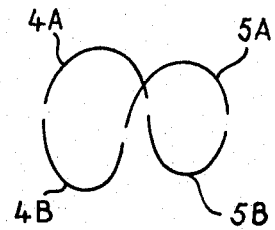

In the neutral position of the lever 9 (FIG. 2), the ribs 4A–5A and 4B–5B are arranged along a perimeter in the form of a saddle (FIG. 1).

Figure 3:
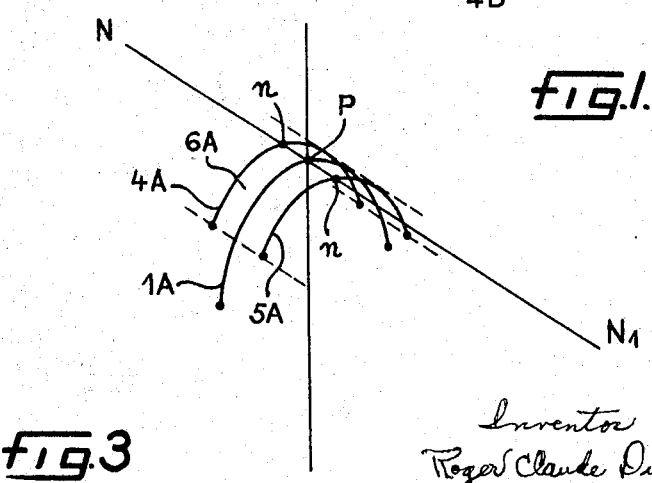
Figure 3A:
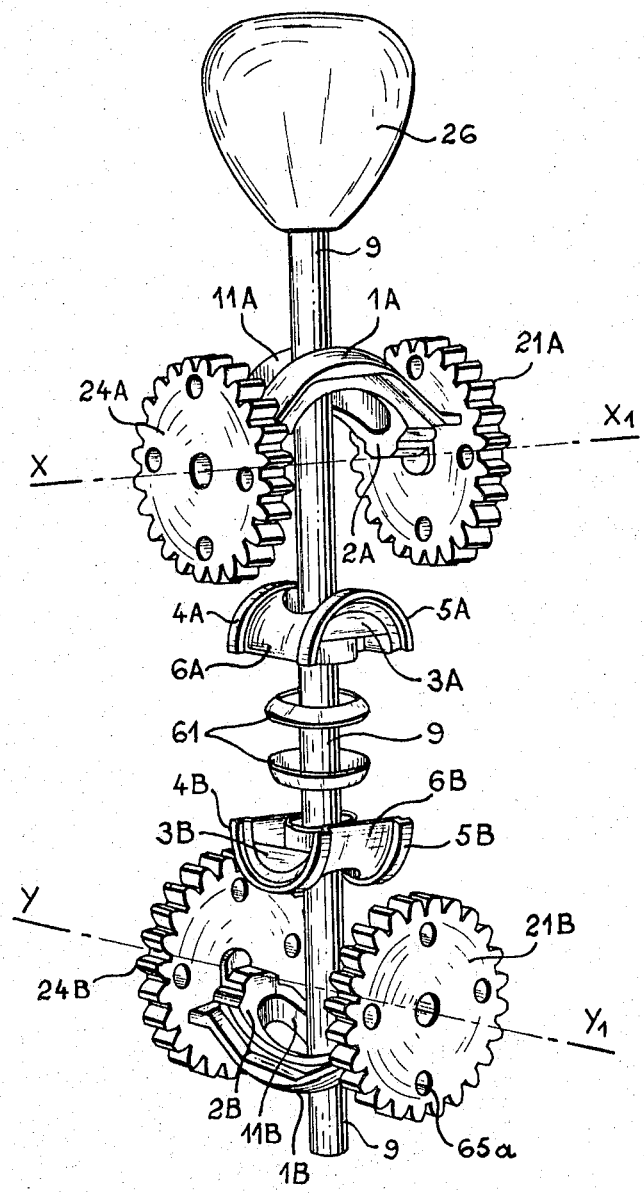
FIG. 3a is an exploded view in perspective of the essential constituent parts of a further form of embodiment of the operating device according to the invention.

In the form of embodiment shown in FIGS. 3 and 3a, the summits $n$ of the guiding ribs and the poles P and P1 are placed substantially on the same straight line N–N1.

In this case, the surfaces 6A and 6B defined by the guiding ribs together with the corresponding internal surfaces 2A and 2B of the slides 1A and 1B are cylindrical, whereas they are convex or form spherical zones in the form of embodiment shown in FIGS. 2, 2a and 2b.

It would also be quite possible, without departing from the scope of the invention, to employ an alternative form (not shown) in which these surfaces are concave.

The actuating movement of the half-core 3A by the operating lever 9 is always parallel to the direction of the ribs 4A–5A. In the same way, in the direction perpendicular to the said ribs, the actuation of the half-core 3B is always parallel to the ribs 4B–5B.

The half-cores may be reduced to the zones 6A and 6B, as shown in FIGS. 3 and 3a, which results in an economy of material and of manufacture.

Each slide is preferably provided with two pinions 21A–24A for the slide 1A and 21B–24B for the slide 1B.

The slides 1A and 1B are also provided with longitudinal slots 11A and 11B for the passage of the lever 9.

Between the two half-cores 3A and 3B are provided either a spring 12 (FIGS. 2, 2a and 2b) or elastic washers 61 of the Belleville type (FIGS. 3 and 3a), which have the effect of applying the two half-cores against the internal surfaces 2A and 2B of the slides 1A and 1B.

In the position of operation, the different constituent parts are in contact with each other, as shown in FIG. 2b, relating to the form of embodiment represented in FIGS. 2 and 2a.

Each of the slides is pivotally mounted on lugs such as the lugs 12A and 13A rigidly fixed to a casing 14, the cover 15 of which is provided with a rectangular opening 16 (see FIG. 5) which permits the operating lever 9 to be actuated in all desired directions, as will be seen in detail later. It is quite clear that the fixing lugs for the slide 1A and those for the slide 1B determine the two perpendicular pivotal axes X–X1 and Y–Y1 of FIG. 2, and the said axes are located in the same horizontal plane passing through the geometric centre O of the assembly.

It is very important to note that the sub-assembly constituted by the two slides, the two half-cores and the internal spring for the latter form a unit which co-operates elastically with the operating lever 9, and that the assembly thus formed is always centered on the geometric point O. It is therefore unnecessary to provide any machined surface of the extremities of the slides, since the reactions are always balanced. This has the important advantage that the walls of the casing 14 can be left as rough castings.

It should be furthermore noted, on the one hand that the lateral ribs may be interrupted at a short distance from the junction plane of the two half-cores 3A and 3B, as has been shown in FIG. 2a; on the other hand, that the internal surfaces 2A and 2B of the slides 1A and 1B are provided with lateral chamfers 7A–8A and 7B–8B, which serve respectively as slide-ways for the lateral ribs 4A–5A of the half-core 3A and for the lateral ribs 4B–5B of the half-core 3B.

The pinions 21A, 21B mounted at the extremities of the slides 1A and 1B constitute a step-up gear system between the lever 9 and the shafts 17 and 18 (see FIG. 2a) actuating the switches or other control devices 19 and 20 (see FIG. 5).

The pinions 21A and 21B engage respectively with pinions of smaller diameter 22 and 23, keyed on the driving shafts 17 and 18.

This arrangement gives the eventual possibility of having four switches operating either symmetrically in pairs or in a given ratio, by providing different gear ratios.

The lever 9 may be hollow and may serve as a guide for a sliding rod 25 of which the upper extremity 25A is provided with an operating head 26 which can slide on a base 27 fixed to the lever 9. The lower extremity 25B of the rod 25 comes into contact with the inner spherical face of the head 28 of a cylindrical member 29 adapted to slide inside a sleeve 30 fixed to the casing 14. A restoring spring 31 continuously urges the head 28 against the half-core 1B and pushes back the extremity 25B of the rod 25 inside the lever 9. Furthermore, the member 29 is connected to the actuating push-rod of a contact 33 known as the "dead man" which, in a manner known per se, compels the operator to constantly hold the operating head 26 in its bottom position in order that the switches 19 and 20, actuated by the movement of the lever, may be supplied electrically through the intermediary of the contact 33.

By virtue of the spherical form of the head 28, it can be seen that the extremity 25B of the rod 25 can remain constantly on its contact, irrespective of the position of the lever 9.

It should be observed that the two half-cores comprise cylindrical sleeves 10A and 10B, the internal diameter of which is exactly fitted on the lever 9.

Finally, a sealing sleeve 34 of elastic material encloses the rod 9 and the cover 15 of the casing so as to prevent dust from passing into the interior of the operating device.

Assuming that the various moving parts are in the relative positions shown in FIG. 2a, that is to say the operating lever 9 being vertical, it is immediately seen that if this latter is pivoted about the geometric centre O in the direction of the arrow F1, while keeping it in the vertical plane containing the axis X–X1, the spherical core is caused to rotate about the said centre O so that the lateral ribs 4A and 5A of the half-core 3A rotate while remaining parallel to the vertical plane containing X–X1, whereas the lateral ribs 4B and 5B of the half-core 3B rotate while remaining at right angles to the said vertical plane containing X–X1.

The result of this is that (see FIGS. 2b and 4):

(1) The ribs 4A and 5A will slide in the corrseponding guides 7A and 8A of the slide 1A, which will remain stationary, the lever 9 sliding in the slot 11A provided for that purpose.

(2) The ribs 4B and 5B will push against the corresponding guides 7B and 8B of the slide 1B, which will pivot in the direction F2 about the axis Y–Y1.

(3) The operating shaft 18 of the switch 20 will rotate in the direction F3.

(4) The operating shaft 17 of the switch 19 will remain stationary.

If now the lever 9 is caused to pivot in the direction of the arrow F4 at the same time keeping it in the vertical plane containing the axis Y–Y1, there is now obtained, by reason of the symmetry of the assembly:

(1) The immobilization in position of the slide 1B;

(2) The pivotal movement of the slide 1A in the direction F5 about the axis X–X1;

(3) The pivotal movement in the direction F6 of the operating shaft 17 of the switch 19;

(4) The immobilization in position of the operating shaft 18 of the switch 20.

Furthermore, it will be clear that if the lever 9 is pivoted in the direction F7 while remaining in any vertical plane, forming for example an angle $\alpha$ with the vertical plane containing the axis Y–Y1, there will be caused the simultaneous rotation of the slide 1A in the direction F5 and of the slide 1B in the direction F2, and in consequence the rotation of the shafts 17 and 18 in the directions F6 and F3 by the combination of a movement of rotation of the ribs of the half-cores 3A and 3B about the centre O and a movement of translation of these same ribs within the corresponding guides of the slides 1A and 1B.

It will here be noted that in the intermediate direction F7, the planes of symmetry of the cap members and the slides (PX–X1 and P1–Y1) do not remain at right angles to each other and are each inclined in an appropriate direction, which renders essential the construction of the central core in two parts spaced slightly apart from each other.

On the other hand, it is immediately apparent that if the lever 9 is moved in the opposite directions to those indicated at F1, F4 and F7, there will be obtained movements of rotation of the shafts 17 and 18 in the opposite direction to those indicated in FIG. 4.

Finally, by means of the combination of relative movements of rotation and translation between the half-core and the slides, the operating lever 9 can be moved in any directions and in particular following any desired curve c, corresponding for example to the control of a combined movement of lifting or lowering and lateral movement of a travelling crane or an ordinary crane or any other apparatus necessitating the combination of a number of simultaneous movements. In other words, the operating device according to the invention makes it possible to obtain, in a particularly effective and simple manner, the correlative synthesis of a number of orders from a single operating lever.

In FIG. 6, a device according to the invention is combined with a contact drum 19 in one direction and a block of two switches 62 in another direction.

Push-rods of these blocks can be actuated by special cams 63 which are fixed laterally on the pinions 21 and 24 (FIGS. 7 and 8).

Each cam, in the form of a square, is provided for its fixing and on one of its arms 63A, two lateral tenons 64 capable of engaging between the teeth of the pinion concerned. A bolt passing through a hole 65 formed in the cam and a hole 65A formed in the pinion complete the fixing (FIG. 3a).

On the other arm 63B of the cam are provided two sloping faces 66 and 67 for actuating push-rods, the profiles of which may be different and varied.

These two ramps 66 and 67 serve to actuate the pushrods of the switches by means of intermediate rollers 66A and 67A (FIGS. 9 and 10).

Between the two ramps 66 and 67 is provided a notching ramp 68 adapted to co-operate with a central roller 68A.

The rollers 66A, 67A, and 68A are carried by a guide 69 capable of being fitted on a block of two switches.

Figure 12:
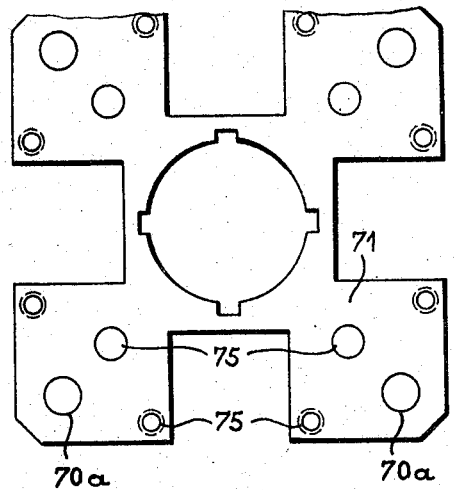
FIG. 12 is a plan view of the plate which permits the fixing of the switch units.
Figure 11:
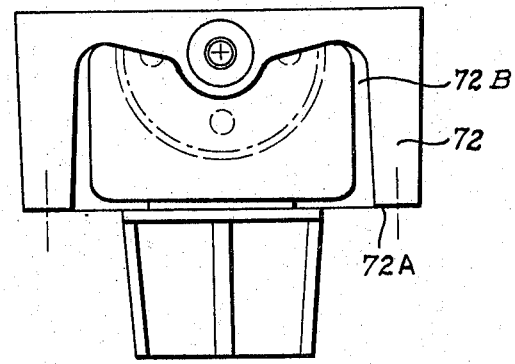
FIG. 11 is a view in elevation to a smaller scale of the cage in which is mounted the swivel and slides unit.

Two holes 70 formed in this guide are provided for its fixing by means of bolts on a plate 71 which is in turn fixed on the face 72A of a cage 72, in which is mounted the swivels and slides assembly (FIGS. 11 and 12). The holes 70 in the guide correspond to holes 70A formed in the plate 71.

The notching ramps 68 of the cams 63 give the operator the feel of their notches and enable him to know exactly the position of his operating lever for a given direction, without looking either at the lever or at his hand.

The contact drum 19 can be actuated by a pinion similar to the pinions 22 and 23 in engagement with the pinions 21 and 24 of the slides 1A and 1B. Windows 72B are formed on the side faces of the cage 72 so as to permit the pinion 22 or 23 of the drum shaft to come into engagement with the pinion 21 or 24 which drives it.

Figure 13A:
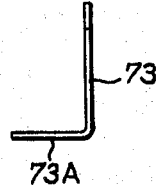
FIGS. 13 and 13a are views respectively in elevation and from one end of a square-support permitting the mounting of a contact drum on the plate of FIG. 12.
Figure 13:
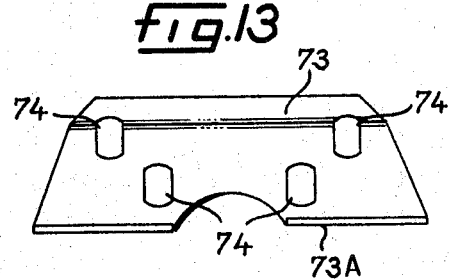

The drum is fixed in turn on the cage 72 by means of a square 73 comprising holes 74 for its fixing by means of screws on the plate 71 which is provided with the corresponding tappings and holes 75 (FIGS. 13 and 13a).

The fixing is carried out after the drum is engaged under the arm 73A of the square 73.

The quadrangular cage 72 may carry a combination of at least one block of two switches for one direction and a contact drum for another direction.

It will of course be understood that the invention has only been described and illustrated by way of pure explanation and not in any limitative sense and that modifications of detail may be made thereto in accordance with its spirit without thereby departing from the scope of the said invention.

I claim:

1. A plural direction single lever operating assembly comprising:
   a core having two parts with a hole through each of said parts;
   two cap shaped slides enclosing said core and arranged in their neutral position in such manner that their longitudinal planes of symmetry are perpendicular to each other and each of said slides having a slot therein;
   lateral guiding ribs located on each of said parts of said core along two half-circles parallel to said plane of symmetry of said part of said core spaced from each other on each of said parts of said core and adjacent said slides with which they are complementary and in contact;
   lateral chamfers on said slides located adjacent to and supporting said guiding ribs;
   a single operating lever passing through the slots in each of said slides and through the holes in each of said parts of said core with the longitudinal axis of said lever passing through the geometric center of said slides and core;
   and means for transmitting movements of rotation of each of said slides about its longitudinal axis of symmetry by pivotal movement of said operating lever about the geometric center of the assembly.

2. An operating assembly as claimed in claim 1, in which surfaces defined by said guiding ribs and by the corresponding internal surfaces of said slides are spherical zones.

3. An operating assembly as claimed in claim 1, in which surfaces defined by said guiding ribs and also the corresponding internal surfaces of said slides are cylindrical.

4. An operating assembly as claimed in claim 1, wherein:
   the slots formed in said slides for the passage of said operating lever therethrough have an opening wider than the diameter of said operating lever;
   and further comprising internal elastic means for urging said parts of said cores in opposite directions so as to provide the necessary close contact between said slides and said parts of said cores.

5. An operating assembly as claimed in claim 1, in which said slides and said core are made of a moulded plastic material.

6. An operating assembly as claimed in claim 1, further comprising:
   an elastic restoring system;
   a dead man contact;
   said operating lever being hollow;
   and a sliding rod housed in said operating lever and having its lower extremity adapted to actuate said dead man contact against the action of said elastic restoring system.

7. An operating assembly as claimed in claim 1, in which gears constitute the means for transmitting the movements of rotation of said slides about their longitudinal axes of symmetry.

8. An operating assembly as claimed in claim 1, in which the operating assembly is connected with two master controllers arranged at right angles to each other through said means for transmitting movements of rotation.

9. An operating assembly as claimed in claim 1, in which the assembly is connected to at least one contact drum for one direction and at least one block of switches for another direction of operation of said operating lever through said means for transmitting movements of rotation.

10. An operating assembly as claimed in claim 1, in which said means for transmitting movements of rotation include lateral pinions attached to said slides.

11. An operating assembly as claimed in claim 10, in which said means for transmitting movements of rotation further include cams connected to said lateral pinions of said slides.

12. An operating assembly as claimed in claim 11, in which said cams include actuating ramps mounted on their periphery of which one of said ramps is notched.

13. An operating assembly as claimed in claim 12, wherein said means for transmitting movements of rotation further include a guide, and rollers supported by said guide in operative contact with said actuating ramps.

14. An operating assembly as claimed in claim 13, in which said guide supporting said rollers is mounted on top of a block of two switches.

References Cited by the Examiner

UNITED STATES PATENTS

| 2,747,035 | 5/1956 | Hansen et al. | |
| 2,762,234 | 9/1956 | Dodd | 74—471 |
| 3,056,867 | 10/1962 | Eeitel | 74—471 X |

MILTON KAUFMAN, *Primary Examiner.*